United States Patent
Weng et al.

(10) Patent No.: US 7,858,047 B2
(45) Date of Patent: Dec. 28, 2010

(54) FLUIDIC DEVICE

(75) Inventors: Kuo-Yao Weng, Hsinchu (TW);
Chien-An Chen, Taipei County (TW);
Cheng-Yu Ko, Taipei County (TW);
Chih-Hsien Su, Kaohsiung (TW);
Nien-Jen Chou, Hsinchu (TW);
Chih-Wen Yang, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 304 days.

(21) Appl. No.: 12/202,414

(22) Filed: Sep. 1, 2008

(65) Prior Publication Data

US 2009/0314366 A1    Dec. 24, 2009

(30) Foreign Application Priority Data

Jun. 18, 2008   (TW) .............................. 97122692 A

(51) Int. Cl.
*G05D 16/00*    (2006.01)

(52) U.S. Cl. ...................... 422/112; 422/100; 422/102; 137/68.11; 137/814; 137/833

(58) Field of Classification Search ................ 422/112, 422/100, 102; 137/68.11, 814, 833
See application file for complete search history.

(56) References Cited

U.S. PATENT DOCUMENTS

| 6,408,884 | B1 | 6/2002 | Kamholz et al. |
| 6,415,821 | B2 | 7/2002 | Kamholz et al. |
| 2008/0021364 | A1 | 1/2008 | Weng |
| 2008/0035499 | A1 | 2/2008 | Weng |
| 2008/0047608 | A1 | 2/2008 | Weng |

*Primary Examiner*—Jill Warden
*Assistant Examiner*—Timothy G Kingan
(74) *Attorney, Agent, or Firm*—Jianq Chyun IP Office

(57) ABSTRACT

A fluidic device is provided for sealing a proper amount of fluid with a brittle material. By moving an adsorbate through an external adsorption force, the brittle material for pre-sealing is broken, and the fluid flows out to interact with the external environment to generate a pump reaction. In addition, the invention may also be used for storing a liquid reagent in a device for a long time. Thereby, the fluidic device can be made small and portable.

24 Claims, 14 Drawing Sheets

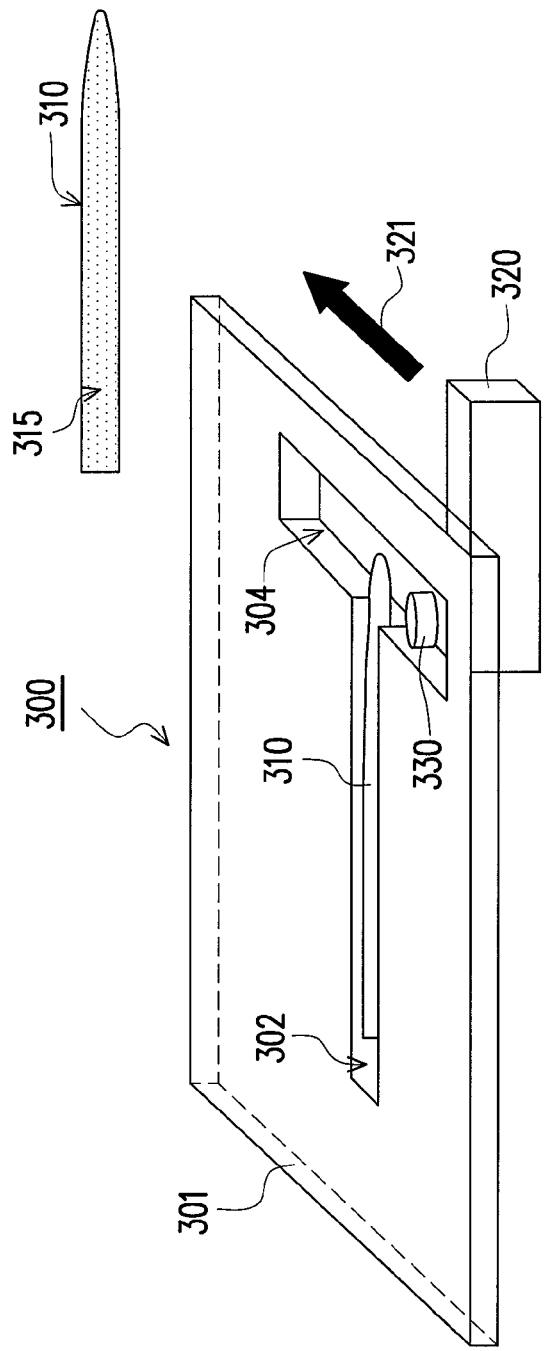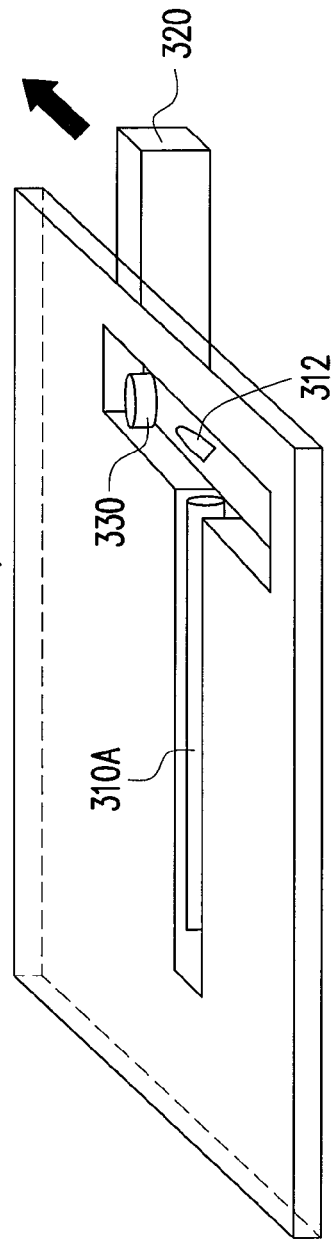
FIG. 3A
FIG. 3B

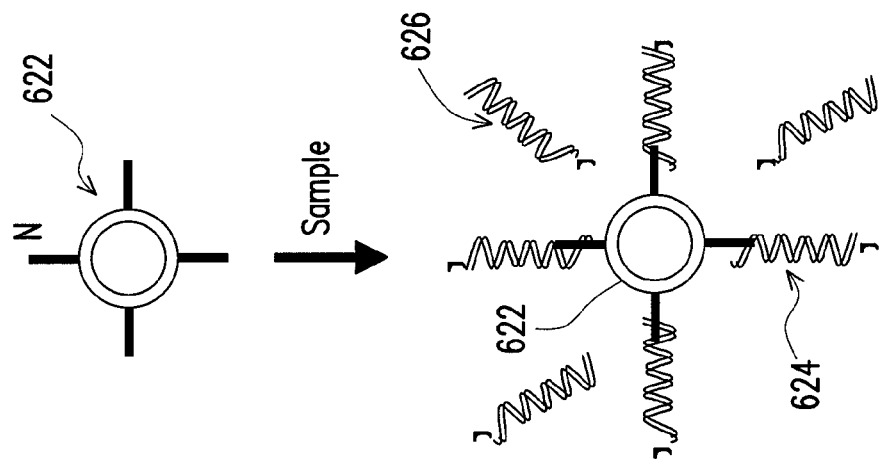
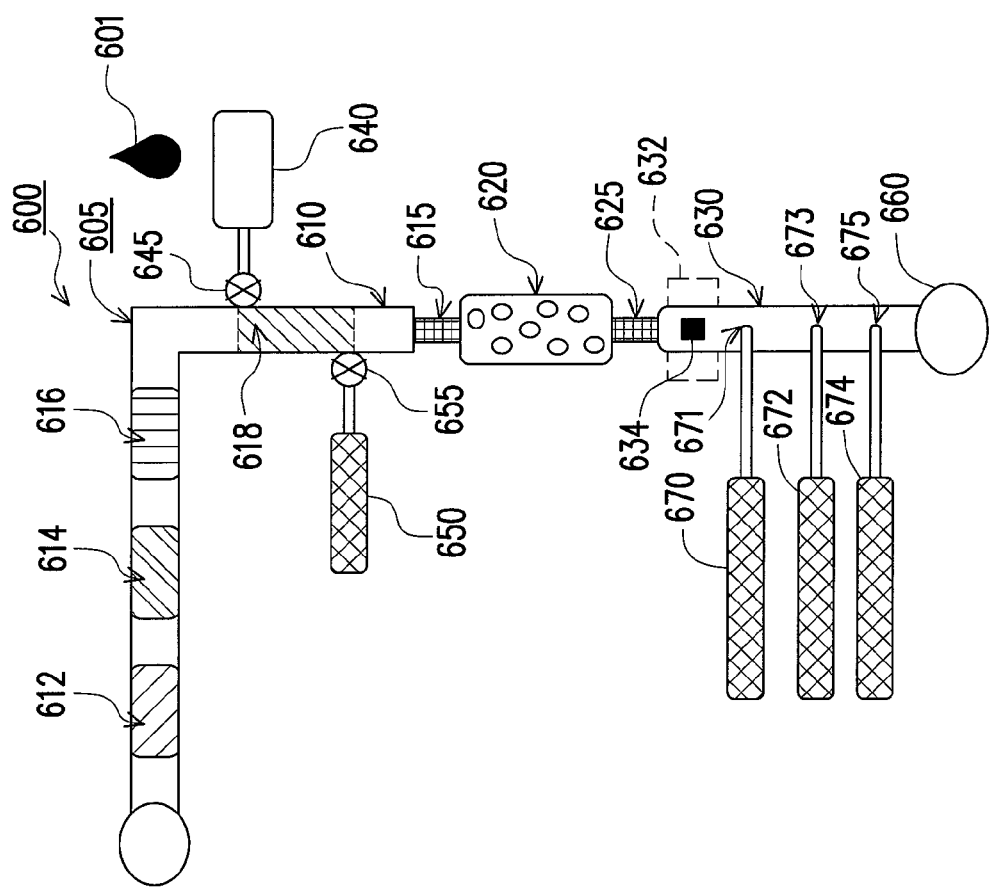
FIG. 6B
FIG. 6A

FLUIDIC DEVICE

CROSS-REFERENCE TO RELATED APPLICATION

This application claims the priority benefit of Taiwan application serial no. 97122692, filed on Jun. 18, 2008. The entirety of the above-mentioned patent application is hereby incorporated by reference herein and made a part of this specification.

BACKGROUND OF THE INVENTION

1. Field of the Invention

The present invention generally relates to a fluidic device, in particular, to a magnetically actuated fluidic device.

2. Description of Related Art

Conventional biochemical reaction experiments are a kind of labour-intensive work. Scientists carry out biochemical reactions on reagents with test tubes and burettes in a lab, mainly for controlling the reagent delivery, mixing a reagent with a checked body, and waiting for a required time to perform a reaction or separation/extraction. A lab of certain scale has already employed mechanical arms to carry out the reactions, so that the labour force is greatly reduced, and the reactions are under precise control. However, the mechanical arm is high in cost, inconvenient to carry, and thus limited in application. Professor Manz from Germany proposed a concept of micro total analysis system (μ-TAS) in 1989, so as to integrate complicated analysis in the lab onto a chip of several centimeters large. That is, the analysis used to be carried out in a lab can be implemented on a microchip, so it is also called lab-on-a-chip, and generally referred to as a microfluidic chip. This chip is widely applied in fields such as medical detection, new drug development, and food inspection.

Microfluidic element and system techniques are mainly directed to control, sense, react, and analyze micro amount of fluid. The key elements include a micro-valve, a micro-pump, a micro-flowmeter, a micro-nozzle, a micro-channel, and a micro-mixer, etc., and those elements can be integrated into intelligent micro-fluidic system chips with various functions. Further, many different methods can be adopted to drive a small amount of (or even a micro amount of) fluid from a storage zone to a mixing region, a reaction zone, an inspection zone, and finally to a waste liquid zone, including syringe and peristaltic pumps, electrochemical bubble generation, acoustics, magnetics, DC and AC electrokinetics, and centrifuge. Four important and feasible methods, namely, centrifuge, pressure, acoustics, and electrokinetics, are compared in the documents.

Pressure and centripetal force are both volume-dependent forces, which scale as $L^3$ (in this case L is the characteristic length corresponding to the capillary diameter). Piezoelectric, electroosmotic, electrowetting, and electrohydrodynamic (EHD) pumping all scale as surface forces ($L^2$), which represent more favorable scaling behavior in the micro domain The above two methods have a broad velocity range, and are used for biochemical analysis for a long time, so their relative equipments and parts are rather mature. The acoustics capable of generating power through the vibration of a solid-liquid interface is complicated in application and still under study.

The electrokinetic must be used with electrodes in contact with a solution. The driving force is related to the ion strength and pH value of the liquid, and is difficult to be widely applied.

The immunoassay employing molecular recognition between antibody and antigen is the most commonly used inspection method at present. Due to its specificity and sensitivity on pathogen inspection, the immunoassay is generally applied to quantitative analysis of substances to be inspected in clinical diagnosis, food inspection, and environmental analysis. The heterogeneous immunoassay is the most widely adopted. In particular, the antibody is usually fixed on a microtiter plate or microbeads. The fixing of the antibody solid phase directly provides a separation effect between the antibody-antigen and the checked body residues, and meanwhile concentrates the subject matter of inspection to a solid phase surface.

The strip immunoassay, known as the lateral-flow immunoassay or immunochromatography, is widely applied in the diagnosis of point-of-care. However, many heterogeneous immunoassays cannot be implemented by means of a strip, and still needs to be handled in centralized laboratories. Besides, the analysis usually lasts for several hours due to the limitation of the quality transmission for diffusion on the microtiter plate. The microfluidic chip can be adopted to reduce the consumption of the samples from 100 mL to 1 mL, and more particularly, greatly shorten the analysis time to tens of minutes. The shortening of the analysis time is caused by a reduction of the diffusion distance from the biomolecules to the solid phase surface, and thus the fluid brings the molecules quite close to the solid phase surface.

The fluid driving force of a microfluidic chip generally comes from external power sources, for example, an electrokinetic flow provided by a high voltage, a pressure flow provided by a syringe pump, or a centrifugation induced flow provided by a mechanical motor. However, these equipments are large in size, high in price, and restrict the microfluidic chip only to be used in the centralized laboratories, so the advantages of the microfluidic chip are greatly weakened. For the application on diagnosis of point-of-care or on-site environmental analysis, a fluid manipulation technique without requiring large external equipments is in urgent need of development. In addition, the microfluidic chip simple in immunoassay and low in cost is the best choice, and more particularly, the microfluidic chip is required to have a single-use characteristic (as such analysis cannot be implemented repeatedly).

Therefore, the above technique should achieve the following efficacies. First, the technique must be able to perform synchronous inspection to obtain similar marker combinations. Further, the technique must be convenient in sampling inspection samples so as to reduce the amount or volume of the samples. In addition, the technique must be employed once to reduce the cost, rapid and simple in operation, and applicable to various kinds of diseases.

SUMMARY OF THE INVENTION

Accordingly, the present invention is directed to a fluidic device and a method thereof for sealing a proper amount of fluid with a brittle material. By moving an adsorbate through an external adsorption force, the brittle material for pre-sealing is broken, and the fluid flows out to interact with the external environment to generate a pump reaction. In addition, the invention may also be used for storing a liquid reagent in a device for a long time. Thereby, the fluidic device can be made small and portable.

The present invention provides a fluidic device including a main body, at least one capillary, and an adsorbate. The main body is provided with a moving channel. The capillary has a closed space inside and is fabricated by a brittle material. A portion of the capillary is located in the moving channel. The adsorbate is disposed in the moving channel, and adsorbed by an external actuating unit to move together in the same direction. The portion of the capillary located in the moving channel is broken after the adsorbate is moved, so that the fluid flows out to interact with the external environment.

The present invention provides a fluidic device including a main body, a sample well, at least one capillary, and an adsorbate. The main body has a moving channel and a reaction channel. The sample well is used for an inspection sample to be placed therein, and is connected to the reaction channel. The capillary has a closed space inside and is fabricated by a brittle material. A portion of the capillary is located in the moving channel, and the opposite end thereof is connected to the reaction channel. The adsorbate is disposed in the moving channel, and adsorbed by an external actuating unit to move together in the same direction. The portion of the capillary located in the moving channel is broken after the adsorbate is moved, so that the fluid flows out to generate a pump reaction, and thus the inspection sample is adsorbed to flow into the reaction channel.

In order to make the aforementioned and other objectives, features, and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3A and 3B are schematic structural views of a fluidic device according to an embodiment of the present invention.

FIG. 6A is a schematic structural view of an inspection chip according to a third embodiment of the present invention.

FIG. 6B is a schematic view illustrating the reaction between a sample and a glass microbead in the inspection chip of FIG. 6A.

DESCRIPTION OF THE EMBODIMENTS

Figure 1A:
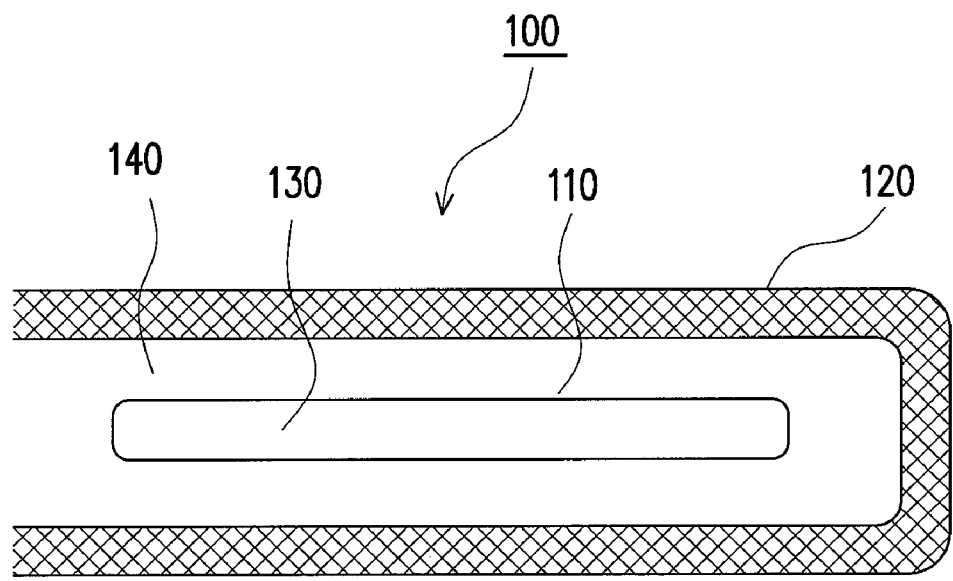
FIGS. 1A and 1B are schematic structural views of a fluidic device with a vacuum pump.

Reference will now be made in detail to the present embodiments of the invention, examples of which are illustrated in the accompanying drawings. Wherever possible, the same reference numbers are used in the drawings and the description to refer to the same or like parts.

A fluidic device and a control method are provided to perform synchronous inspection to obtain similar marker combinations. Further, the technique must be convenient in sampling inspection samples so as to reduce the number of the checked body. In addition, the technique must be employed once to reduce the cost, rapid and simple in operation, and applicable to various kinds of diseases.

U.S. patent applications entitled "a fluidic device and a control method thereof", Ser. Nos. 11/612,882 and 11/612,896 are filed by the same inventors of the present application. Meanwhile, the inventor also applies for ROC patent application No. 96,125,027 and PRC patent application No. 200710136828.X, which claims the priority of U.S. Provisional application 60/831,285 filed on Jul. 17, 2006. These applications are incorporated herein by reference herewith.

In the above patent applications, a fluidic device with two zones made by a brittle material and a deformable material is provided. The two zones are in different states. When an external mechanical force is applied to deform the deformable material, the brittle material is broken to serve as an element pump, valve, and fluid route for fluid manipulation. For example, control components, such as a vacuum pump, a gas pump, a broken open valve, and a self-close valve, are obtained for controlling the flow of the fluid in the fluidic device.

The fluidic device may guide the fluid in the channel with the vacuum pump in a specific direction, and push the fluid in the channel with the gas pump in the specific direction. The broken open valve is adopted to connect two separated zones under the control of a user, and the self-close valve is used to automatically seal the channel after the fluid passes through. The vacuum pump, gas pump, broken open valve, and self-close valve are all small in size, so that the fluidic device can be made small and portable.

Figure 1B:
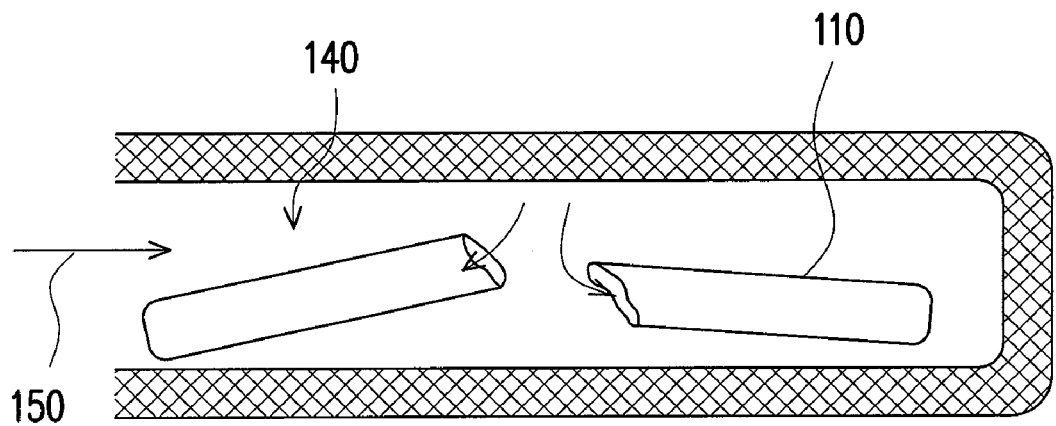

As for the fluidic device, in an embodiment, the structure of a vacuum pump is illustrated with reference to FIG. 1A. A container 110 is disposed in a channel 140 (or chamber) defined by a material 120 to construct a vacuum pump 100. The container 110 seals a zone 130 in vacuum or with a gas pressure lower than that of the channel 140. Referring to FIG. 1B, the container 110 is made of, for example, glass, and may be broken once an external force is applied thereto. When the container 110 is broken, the gas in the channel 140 flows into the vacuum zone 130, thus reducing the pressure in the zone 140. In this manner, an attraction force is generated to lead the fluid to the zone 140 in a direction 150.

Figure 2A:
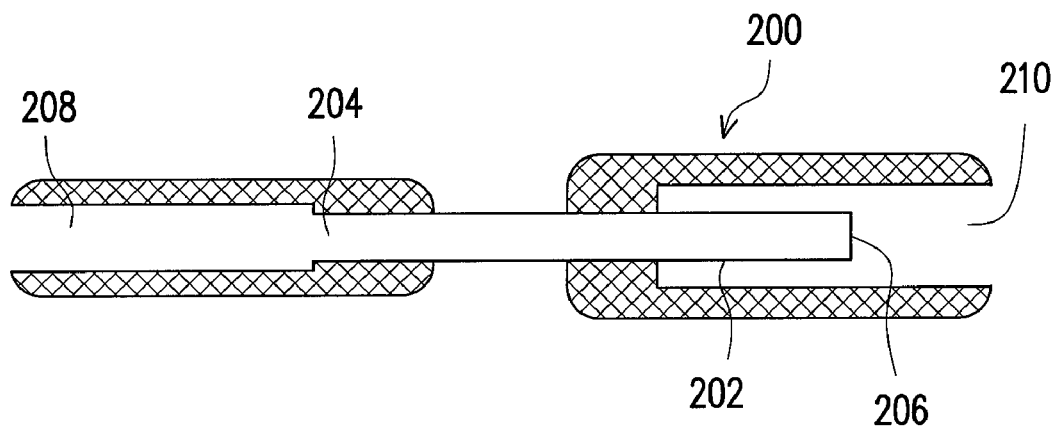
FIGS. 2A and 2B are schematic structural views of a fluidic device with two channels.
Figure 2B:
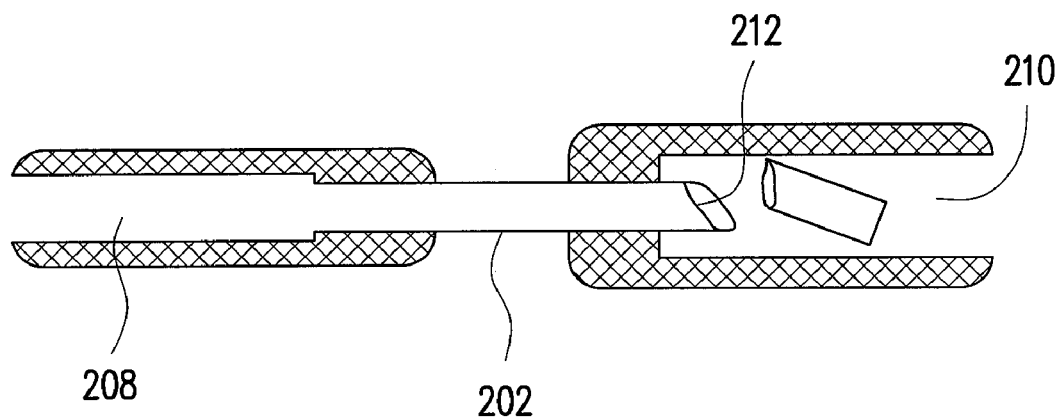

As for the fluidic device, in another embodiment, referring to FIG. 2A, a glass capillary 202 is disposed between a first channel 208 and a second channel 210 to fabricate a broken open valve 200. The glass capillary 202 has an open end 204 disposed in the first channel 208 and a closed end 206 disposed in the second channel 210. When the glass capillary is unbroken, the fluid cannot flow between the first channel 208 and the second channel 210, which is referred to as a closed state of the broken open valve. Further, referring to FIG. 2B, when an external force is applied to break the glass capillary 202, a passage 202 connecting the channel 208 and the channel 210 is formed, which is referred to as an open state of the broken open valve. The broken open valve 200 is used to separate two fluids (or a fluid and a solid) initially, and then allow the two fluids to interact under the control of the user.

In the fluidic device, it is restrained that the brittle material is broken when an external mechanical force is applied to deform the deformable material, so as to generate functions such as a vacuum pump, gas pump, and broken open valve. When the sample of a liquid and a reagent need to have their volumes precisely determined or the liquid has to be accurately transferred to a certain position, errors may occur to the method based on the compression of the deformable material after deformation. Further, the brittle material (for example, glass) is broken under an external mechanical force, which may result in damages to the deformable material and then a failure of the subsequent elements.

The present invention provides a fluidic device and a method thereof, in which a proper amount of fluid (such as vacuum, compressed air, gas, or liquid reagent) with a brittle material (for example, a glass capillary). By moving a magnetic substance through the adsorption of an external magnet (or electromagnet), the brittle material for pre-sealing is broken, and the fluid in the brittle material flows out to interact with the external environment to generate a pump reaction (for example, in the application of pre-sealing vacuum, compressed air, or gas). In addition, the invention may also be used for storing a liquid reagent (for example, in the application of a buffer reagent or a washing liquid) in a device for a long time. Thereby, the fluidic device can be made small and portable.

In the fluidic device provided by the present invention, the brittle material has a fragile structure made of, for example, quartz, glass, ceramic, plastic, or a composite material. The proper amount of fluid sealed therein includes vacuum, compressed air, gas, or liquid reagent. Further, the external magnetic field is generated by a magnetic substance such as a permanent magnet or an electromagnet.

First Embodiment

Referring to FIGS. 3A and 3B, a fluidic device according to a first embodiment of the present invention is shown. The fluidic device 300 includes a main body 301 with, for instance, a T-shaped groove composed of a groove 302 and a groove 304 perpendicular thereto. A capillary 310 made of a brittle material is placed in the groove 302, and a portion thereof is disposed in the groove 304, i.e., protruding in the groove 304. The capillary 310 is, for example, a glass capillary, or a fragile structure made of quartz, ceramic, plastic, or a composite material. A closed space 315 inside the capillary 310 seals a proper amount of vacuum, compressed air, gas, liquid reagent, or fluid. The fluidic device 300 further includes a magnetic actuating unit set composed of a first magnetic unit 320 and a second magnetic unit 330. The first magnetic unit 320 is an external actuating unit made of, for example, a magnetic or electromagnetic coil, and the second magnetic unit 330 is an adsorbate made of a material attracted by the magnetic force. The materials of the external actuating unit and the adsorbate are exchangeable. As shown in FIG. 3A, the first magnetic unit 320 is moved to a position below the second magnetic unit 330 of the main body 301, and the second magnetic unit 330 is placed in the groove 304. When the first magnetic unit 320 is moved, the second magnetic unit 330 may be actuated correspondingly.

When the first magnetic unit 320 gets close to and attracts the second magnetic unit 330, and then moves in a direction 321 shown in FIG. 3A, the second magnetic unit 330 is actuated to move together in the direction 321. Thereby, the portion of the capillary 310 protruding in the groove 304 is broken (a broken capillary 310A and a broken portion 312 are shown in FIG. 3B), so that the closed space 315 in the capillary communicates with the external environment. Meanwhile, the fluid pre-sealed in the capillary 310A interacts with the external environment to generate a pump reaction, for example, in the application of pre-sealing vacuum, compressed air, or gas, or in the application of storing a liquid reagent (for example, a buffer reagent or a washing liquid) in the fluidic device 300 for a long time. Thereby, the fluidic device 300 can be made small and portable.

The first magnetic unit 320 is moved towards the direction 321, for example, manually, or by a power spring or an electric motor according to design requirements.

Based on the above embodiment, FIGS. 4A to 4F are schematic views illustrating the structure of the fluidic device and processes of inspecting a sample.

Figure 4A:
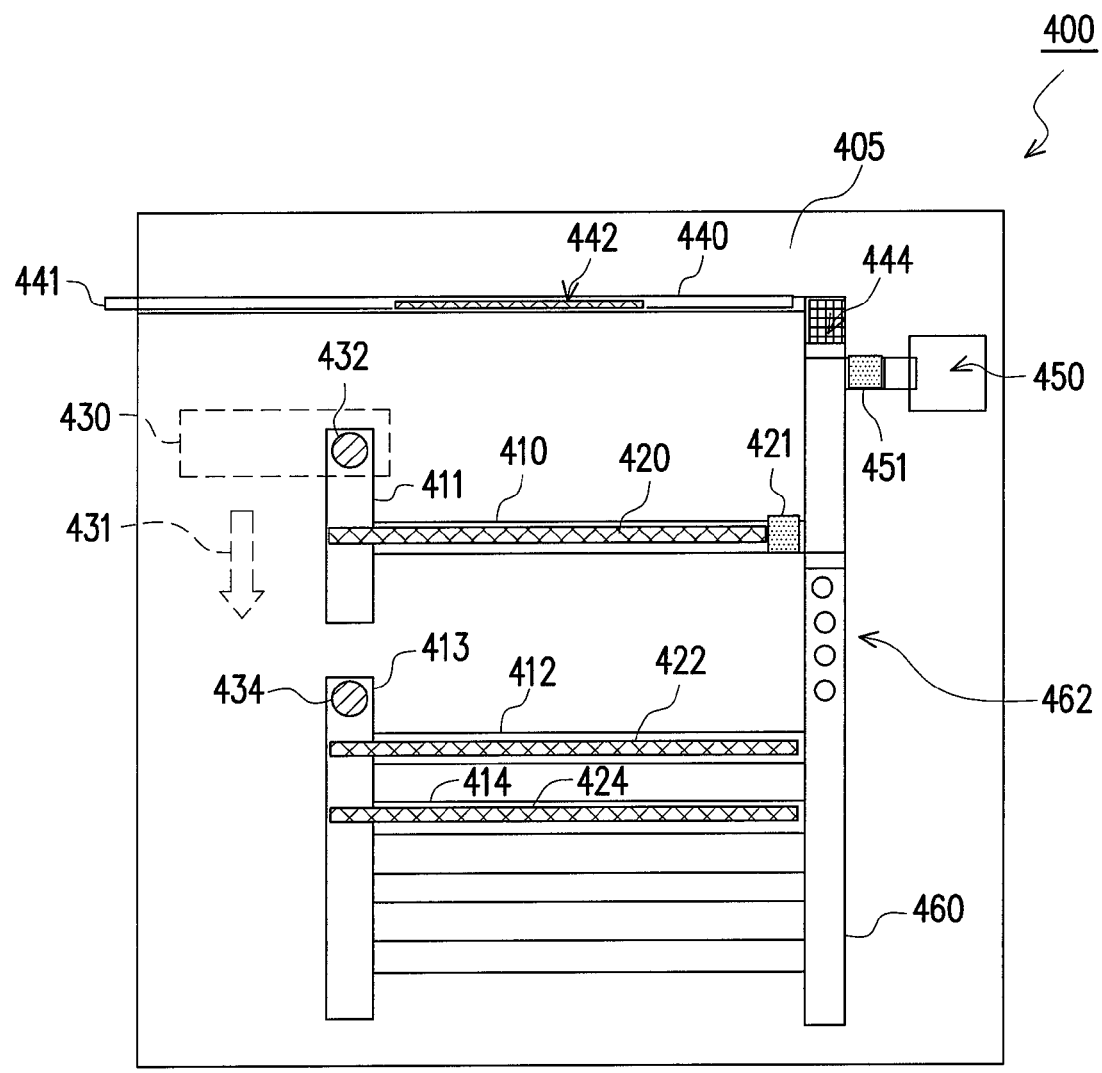
FIGS. 4A to 4F are schematic views illustrating the structure of the fluidic device and processes of inspecting a sample according to the embodiment of FIG. 3A.
Figure 4B:
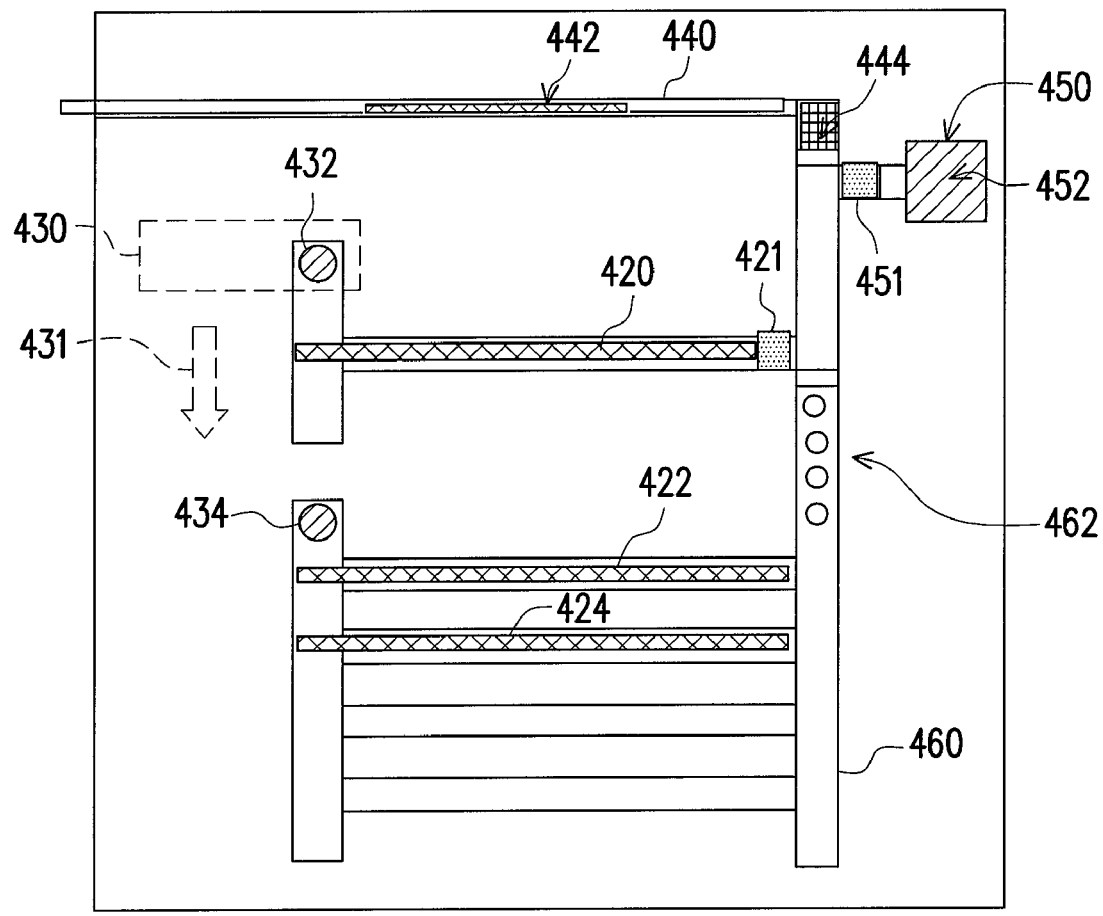

First, referring to FIG. 4A, the fluidic device 400 includes a main body 405 with, for example, two T-shaped grooves. One T-shaped groove is composed of a groove 410 and a groove 411 perpendicular thereto. A capillary 420 made of a brittle material is placed in the groove 410, and a portion thereof is disposed in the groove 411, i.e., protruding in the groove 411. The other T-shaped groove is composed of two parallel grooves 412, 414 and a groove 413 perpendicular thereto. Capillaries 422, 424 made of a brittle material are respectively placed in the grooves 412, 414, and a portion of each capillary is disposed in the groove 413, i.e., protruding in the groove 413. The capillaries 420, 422, and 424 are, for example, glass capillaries, or fragile structures made of quartz, ceramic, plastic, or a composite material. A closed space 315 inside the capillary 420 seals a proper amount of vacuum, compressed air, gas, liquid reagent, or fluid.

In this embodiment, the capillaries 420, 422, and 424 are vacuum-sealed, and may generate an adsorption force when broken so as to draw an inspection sample to a proper position. The control time varies upon different designs of the T-shaped groove, and the details will be given below.

The fluidic device 400 further includes two magnetic actuating unit sets composed of a magnetic unit 430 and two magnetic units 432, 434 respectively disposed in the two T-shaped grooves. The magnetic unit 430 is an external actuating unit made of, for example, a magnetic or electromagnetic coil, and the magnetic units 432, 434 are adsorbates made of a material attracted by the magnetic force. The materials of the external actuating unit and the adsorbate are exchangeable. As shown in FIG. 4A, the magnetic unit 430 is disposed below the magnetic unit 432 of the main body 405, and the magnetic unit 430 when moving in a direction 431 may correspondingly actuate the magnetic units 432, 434 to move in the same direction.

The magnetic units 432, 434 are respectively disposed in the two different T-shaped grooves to effectively control the time sequence of breaking the capillaries 420, 422, and 424. For example, when the capillary 420 is broken by moving the magnetic unit 432, a vacuum state is released to draw the inspection sample to move. Then, the capillaries 422 and 424 are sequentially broken by moving the magnetic unit 432, which may be designed according to different time points or different sequences, that is, the fluidic device 400 of this embodiment is characterized in operating at a fixed time and sequence, and capable of implementing an inspection at a predetermined time or sequence. Besides planning the positions of the magnetic units 432, 434, different types of actuating designs of the magnetic unit 430 can be adopted to achieve various purposes. For example, the magnetic unit 430 can be moved manually, or by an electric motor, a non-electric power spring, or a gear set with a certain gear ratio. In addition, any mode capable of controlling the moving speed is applicable to this embodiment.

The capillaries 420, 422, and 424 each have the other end connected to a reaction channel 460. A capillary 440 with a pre-load liquid 442 has one end connected to the reaction channel 460, and the other blind end 441 in a sealed state. A lyophilized labelled antibody 444 is disposed at the joint portion between the capillary 440 and the reaction channel 460. A sample well 450 is disposed near the lyophilized labelled antibody 444 and connected to the reaction channel 460. A superabsorbent polymer (SAP) swelling valve 451 is connected between the sample well 450 and the reaction channel 460, and is closed after a certain amount of fluid passes through. A detailed technical description of the SAP swelling valve 451 can be found in U.S. Provisional application 60/831,285 filed on Jul. 17, 2006, which is incorporated herein by reference. Further, another SAP swelling valve 421 is connected between the capillary 420 and the reaction channel 460, so as to prevent the sample liquid from being led into the capillary 420.

Further, a capture antibody array 462 immobilized on solid state is connected between the capillaries 420, 422 and the reaction channel 460.

Figure 4C:
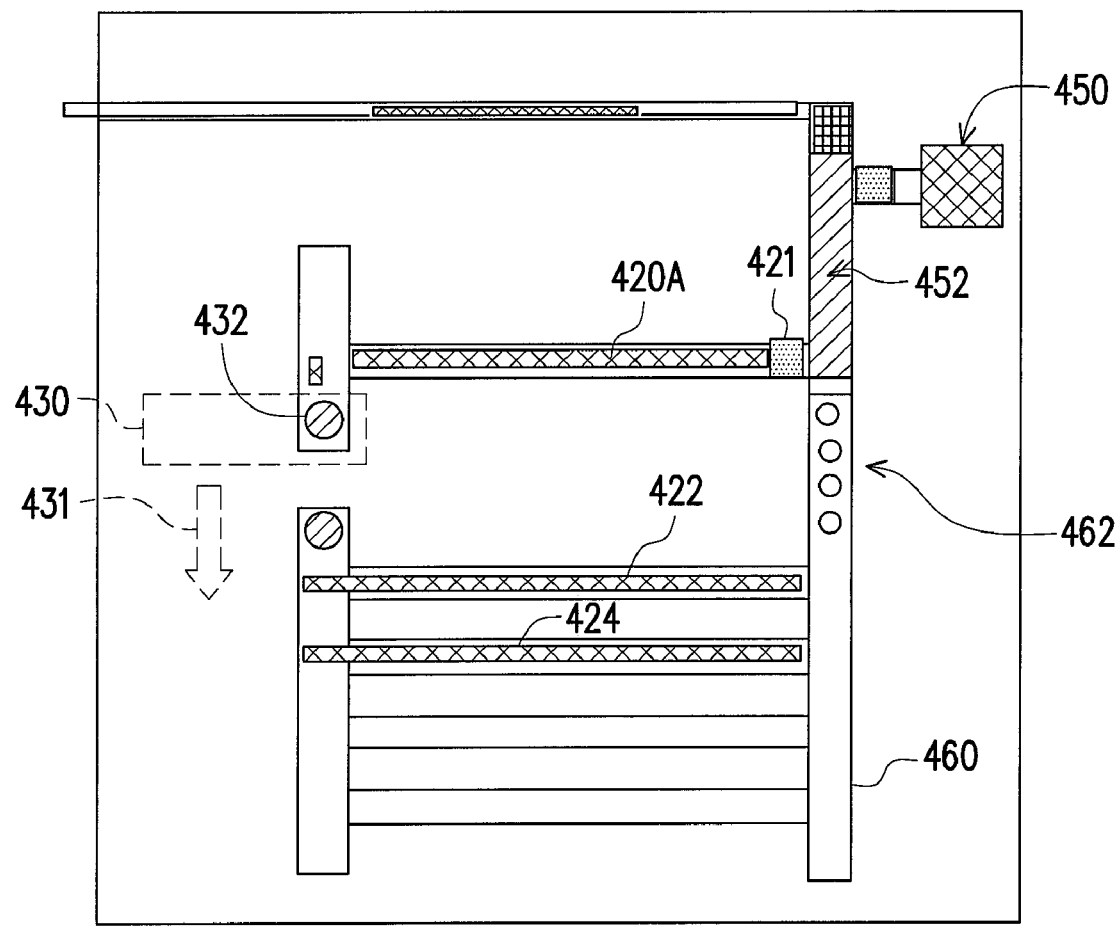

The configuration and operating process inside the reaction channel 460 are shown in FIGS. 4B to 4F. First, referring to FIG. 4B, an inspection sample 452 is placed in the sample well 450. Then, as shown in FIG. 4C, the magnetic unit 430 is moved to drive the magnetic unit 432 to move forward in the direction 431 by the magnetic force, so that the capillary 420 in a vacuum state is broken (a broken capillary 420A is shown in the figure), and the inspection sample 452 in the sample well 450 may flow into the reaction channel 460 through the SAP swelling valve 451. Thereafter, the SAP swelling valves 421 and 451 are closed.

Figure 4D:
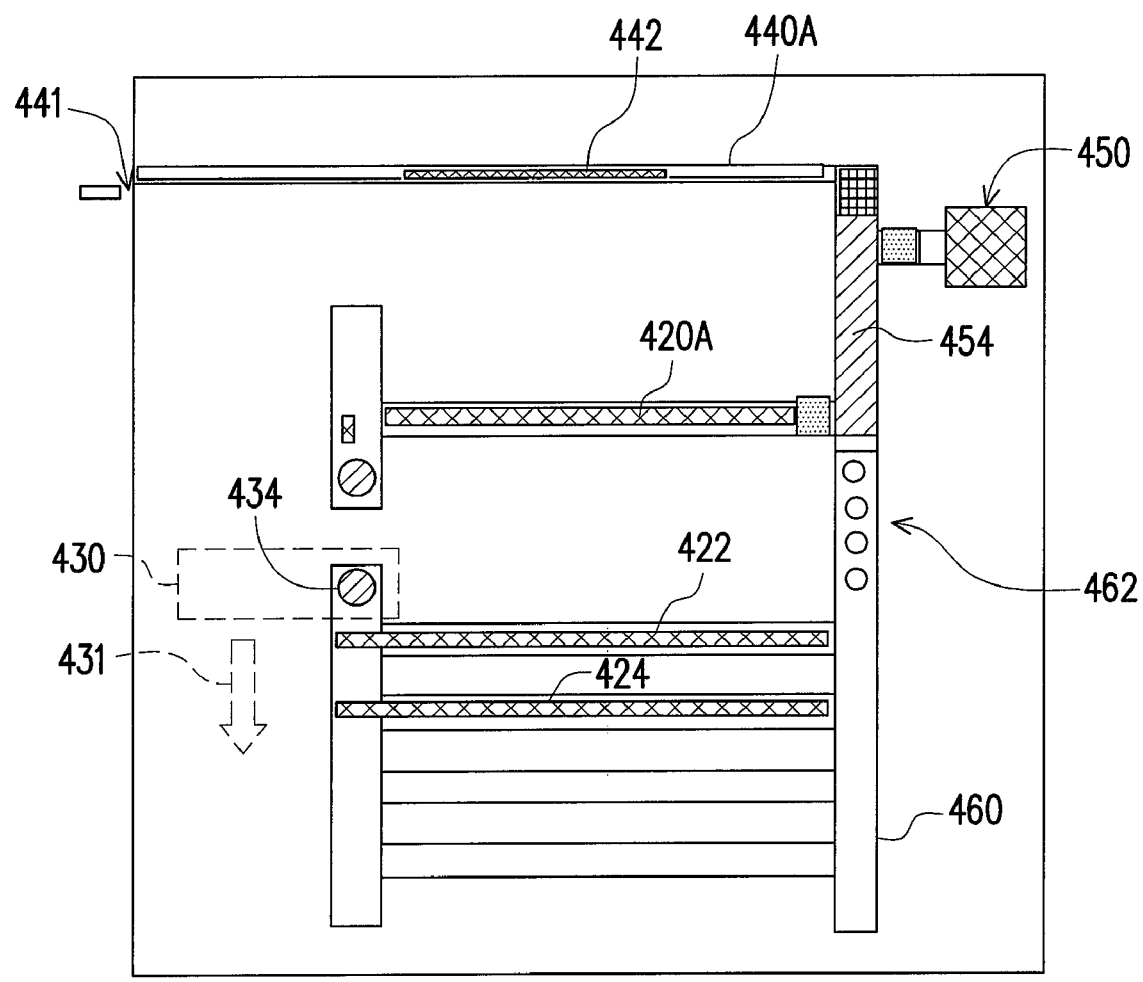

Next, referring to FIG. 4D, the other blind end 441 of the capillary 440 is broken. Afterward, the magnetic unit 430 is moved in the direction 431 to the bottom of the magnetic unit 434, so as to drive the magnetic unit 434 to move forward to break the capillary 422.

Figure 4E:
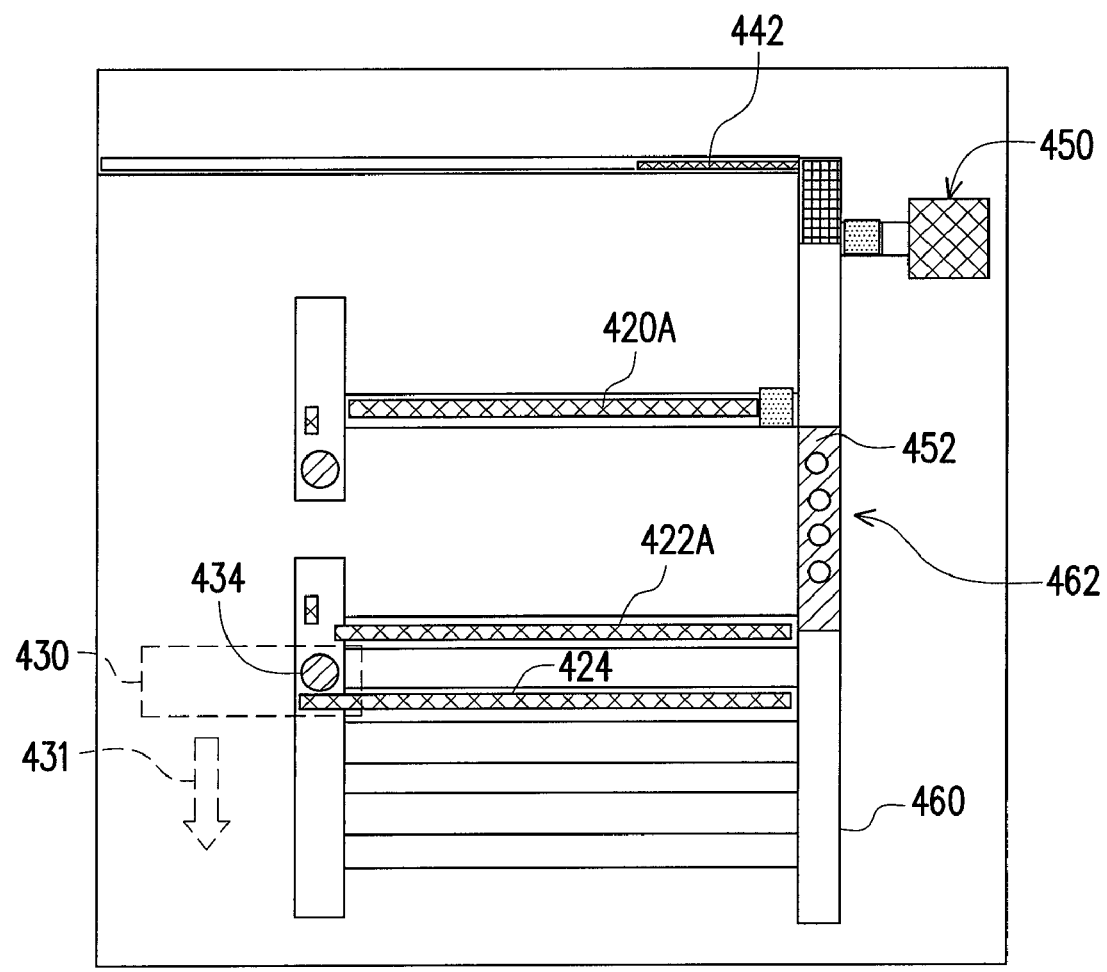

Referring to FIG. 4E, with the movement of the magnetic unit 434, the magnetic unit 434 breaks the capillary 422 in a vacuum state (a capillary 422A is shown in the figure), so that the pre-load liquid 442 in the capillary 440 is drawn to dissolve the lyophilized labelled antibody 444 and flow into the reaction channel 460. Meanwhile, a labelled sample (quantitative sample) 454 in the reaction channel 460 is drawn to the position of the capture antibody array 462.

Figure 4F:
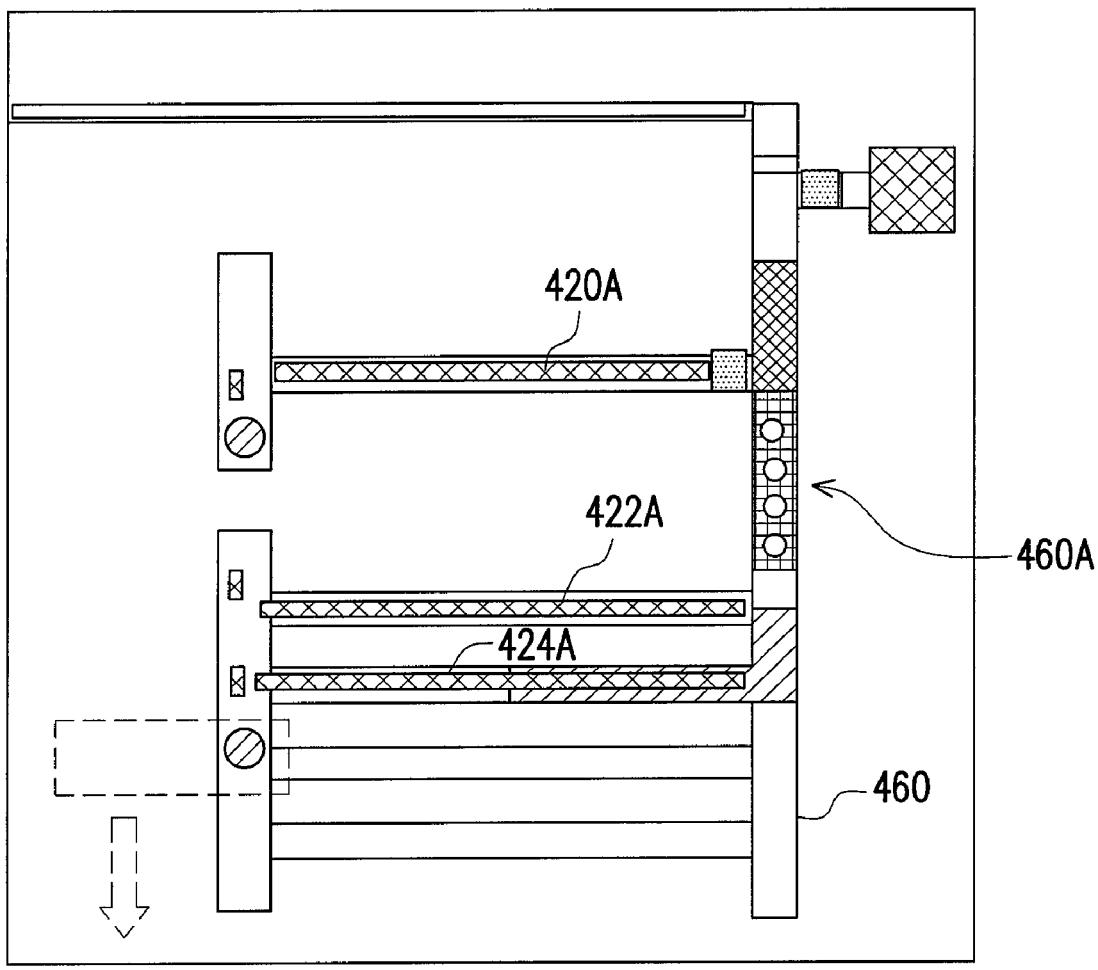

Thereafter, in FIG. 4F, the magnetic unit 434 is further moved to break the capillary 424 (a broken capillary 424A is shown in the figure), so that the labelled sample 454, the dissolving solution of the lyophilized labelled antibody 444, and the pre-load liquid 442 are guided to sequentially flow through the reaction channel 460.

Second Embodiment

Sandwich Assay

Figure 5:
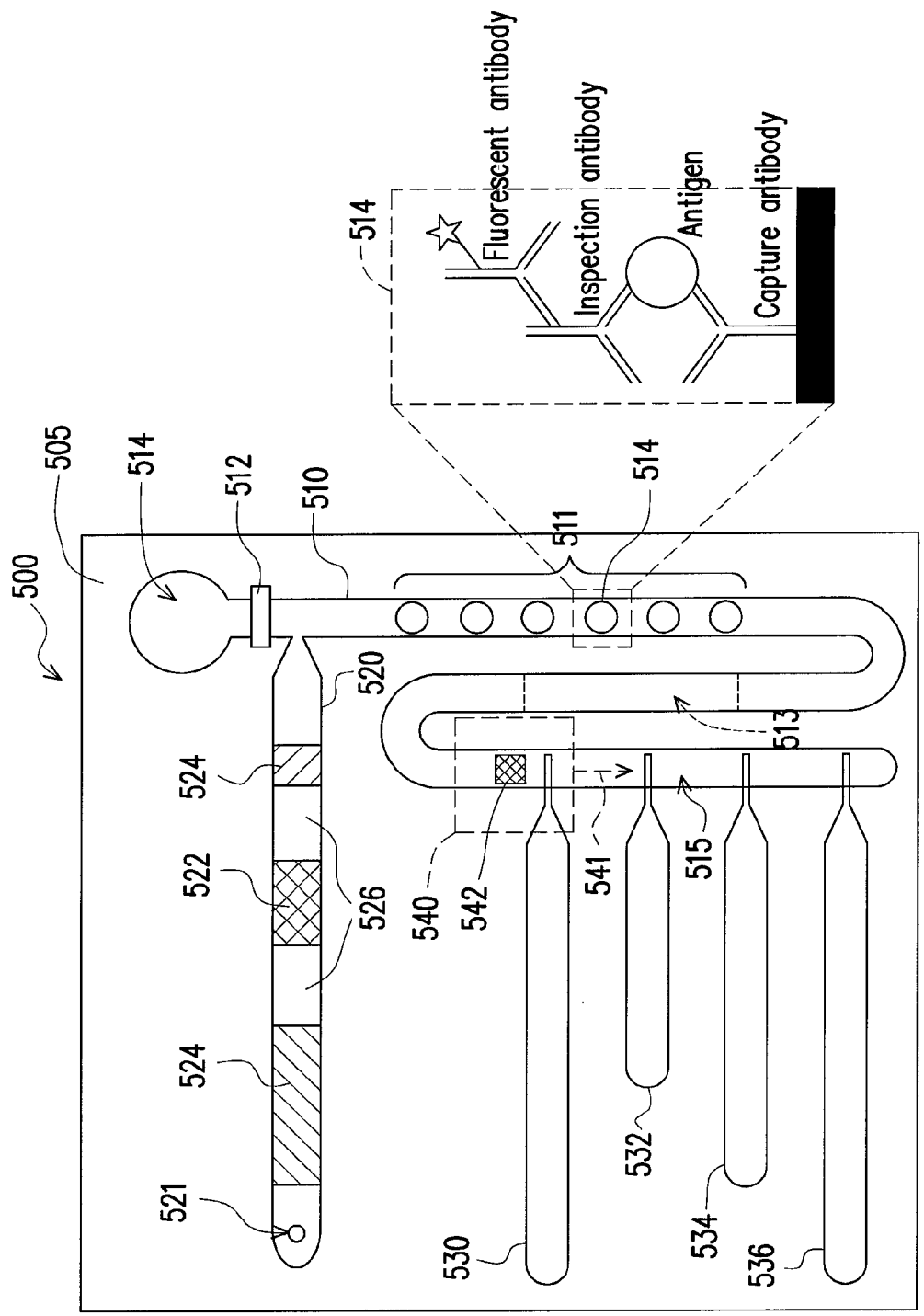
FIG. 5 is a schematic structural view of a fluidic device according to a second embodiment of the present invention.

Referring to FIG. 5, a schematic structural view of a fluidic device according to a second embodiment of the present invention is shown. The fluidic device 500 includes a main body 505 with a reaction channel 510 of a multi-bent structure. A capture antibody zone 511, a scrap zone 513, and an actuating zone 515 are disposed in the multi-bent structure. Further, a capture antibody array 514 is disposed in the capture antibody zone 511. Vacuum tubes 530, 532, 534, and 536 in different sizes are disposed in the actuating zone 515, and each have a portion protruding in the actuating zone 515. The protruding portions of the vacuum tubes 530, 532, 534, and 536 are, for example, glass capillaries, or fragile structures made of quartz, ceramic, plastic, or a composite material. In this embodiment, the protruding portions of the vacuum tubes 530, 532, 534, and 536 are broken according to a designed time sequence, so as to generate an adsorption force for drawing an inspection sample to a proper position.

The fluidic device 500 further includes a magnetic actuating unit set composed of a magnetic unit 540 and an adsorbate 542. The magnetic unit 540 is, for example, made of a magnetic or electromagnetic coil, and the adsorbate 542 is, for example, a magnet or electromagnet, or any material attracted by the magnetic unit 540. As shown in FIG. 5, the magnetic unit 540 is disposed below the adsorbate 542 of the main body 505, and the magnetic unit 540 when moving in a direction 541 may correspondingly actuate the adsorbate 542 to move in the same direction. Then, the protruding portions of the vacuum tubes 530, 532, 534, and 536 are sequentially broken by moving the magnetic unit 540 at different time points or sequences so as to generate an adsorption force. That is, the fluidic device 500 of this embodiment is characterized in operating at a fixed time and sequence, and capable of implementing an inspection at a predetermined time or sequence.

In the fluidic device 500 of this embodiment, different types of actuating designs of the magnetic unit 540 can be adopted to achieve various purposes. For example, the magnetic unit 540 can be moved manually, or by an electric motor, a non-electric power spring, or a gear set with a certain gear ratio. In addition, any mode capable of controlling the moving speed is applicable to this embodiment.

In the reaction channel 510 of a multi-bent structure, the front end of the capture antibody zone 511 is connected to the sample well 514 with a swelling valve 512 (for example, an SAP swelling valve) disposed there-between. Moreover, the swelling valve 512 is not limited to an SAP swelling valve, and any swelling valve capable of being automatically closed after a sample passes through for a while is available.

A storage tube 520 with an air vent 521 at an end is connected to the reaction channel 510 between the capture antibody zone 511 and the sample well 514. A wash buffer 524, a premixed detection and fluorescent antibody 522, and the wash buffer 524 are sequentially filled in the storage tube 520, and separated from each other by an air spacer 526. The air vent 521 is initially closed and waits to be opened.

The fluidic device 500 is operated in the following manner.

First, a sample is added in the sample well 514. The magnetic unit 540 actuates the adsorbate 542 to move in the direction 541, so that the protruding portion of the vacuum tube 530 is broken to generate an adsorption force. Thereby, the sample is adsorbed to a fixed position to interact with the capture antibody array 514 in the capture antibody zone 511. After a sufficient period of time, the air vent 521 in the storage tube 520 is open, and the magnetic unit 540 actuates the adsorbate 542 to move in the direction 541, so that the protruding portion of the vacuum tube 532 is broken to generate an adsorption force. In this manner, a first section of the wash buffer 524 in the storage tube 520 is adsorbed into the reaction channel 510 to wash the reaction zone (i.e., the capture antibody zone 511).

After a while, the magnetic unit 540 actuates the adsorbate 542 to move in the direction 541, so that the protruding portion of the vacuum tube 534 is broken to generate an adsorption force. Thereby, the premixed detection and fluorescent antibody 522 is adsorbed into the reaction zone of the reaction channel 510, and interacts with an antigen for a certain period of time. Then, the protruding portion of the vacuum tube 536 is broken, and a second section of the wash buffer 524 in the storage tube 520 is adsorbed into the reaction channel 510 to wash the reaction zone. Till now, the sandwich assay of this embodiment is finished.

Third Embodiment

Nucleic Acid Molecule Inspection (Glass Microbead) Chip Design

Referring to FIG. 6A, a schematic structural view of a fluidic device (an inspection chip herein) according to a third embodiment of the present invention is shown. The inspection chip 600 includes an L-shaped reaction channel 605. The reaction channel 605 includes a quantitative zone 610, a reaction zone 620, and an actuating zone 630. The quantitative zone 610 is connected to the reaction zone 620 through a network micro-structure zone 615, and the reaction zone 620 is connected to the waste liquid collection zone 630 through a network micro-structure zone 625. As shown in FIG. 6B, a plurality of particularly processed glass microbeads 622 is disposed in the reaction zone 620. Thus, when targets to be inspected in a sample pass by, each glass microbead 622 will be integrated with the targets (i.e., targets 624 in the figure) and capture the targets in the chamber. Molecules not to be inspected or impurities (i.e., non-inspected substances 626) will be washed by the solution to the waste liquid collection zone at the rear end. In addition, the quantitative zone 610 has three sections of pigment and buffer solutions 612, 614, and 616.

Further, an injection zone 640 is connected to the reaction channel 605 through a gel valve 645, and the gel valve 645 is designed to expand after absorbing water so as to prevent an injected reactant from flowing into the reaction channel 605. Besides, a vacuum valve tube 650 is connected to the reaction channel 605 through another gel valve 655. A reaction zone 618 of the reaction channel 605 is located between the gel valve 645 and the gel valve 655, and thus a quantitative volume effect is generated for storing the reactant.

In addition, three vacuum gas tubes 670, 672, and 674 are provided, and respectively have capillaries 671, 673, 675 at an end extending to the actuating zone 630.

The inspection chip 600 further includes a magnetic actuating unit set composed of a first magnetic unit 632 and a second magnetic unit 634. The first magnetic unit 632 is an external actuating unit made of, for example, a magnetic or electromagnetic coil. The second magnetic unit 634 is an adsorbate made of a material attracted by the magnetic force and disposed in the actuating zone 630 of the reaction channel 605. The materials of the external actuating unit and the adsorbate are exchangeable. The first magnetic unit 632 can be moved to a position below the second magnetic unit 634, and when the first magnetic unit 632 is moved, the second magnetic unit 634 is correspondingly actuated to move in the reaction channel 605. Thereby, the capillaries 671, 673, 675 are sequentially broken, and the vacuum gas tubes 670, 672, 674 are opened one by one.

The inspection chip 600 is operated in the following manner.

First, an animal blood or any other biological sample 601 is dripped into the injection zone 640. Then, the vacuum valve tube 650 is opened to let the inspection sample flow through the gel valves 645, 655 to the reaction zone 618. As the gel valves 645 and 655 are designed to expand after absorbing water, the sample is prevented from flowing into the channel, and thus achieves a quantitative volume effect in the reaction zone 618.

Next, when the first magnetic unit 632 is moved, the second magnetic unit 634 is correspondingly actuated to move in the reaction channel 605. Thereby, the capillaries 671, 673, 675 are sequentially broken, and the three vacuum gas tubes 670, 672, 674 are opened one by one. The sample in the reaction zone 618 and the pigment and buffer solutions (612, 614, 616) pre-sealed in the chip sequentially flow into the reaction zone 620 with the sample. As the reaction zone 620 has the particularly processed glass microbeads 622, when nucleic acid molecules to be inspected in the sample (for example, the targets 624 in FIG. 6B) pass by, the glass microbeads 622 are integrated with the nucleic acid molecules to capture the nucleic acid molecules in the chamber. The molecules not to be inspected or impurities (i.e., the non-inspected substances 626 in FIG. 6B) are washed by the solution to a scrap collection pool 660 in the waste liquid collection zone 630 at the rear end. The network micro-structure zones 615 and 625 are micro-structures in a shape of net, and are used for preventing the glass microbeads 622 from flowing out.

In the above embodiment, a chemical or physical surface treatment is performed on the glass microbeads 622 with a diameter ranged from 1 to 500 μm (micrometer) in size, so that each microbead 622 can be integrated with the nucleic acid molecules DNA or RNA. Further, a fixed number of microbeads are disposed in the reaction zone 620. Thereby, if the sample contains the inspection object molecules 624, an integration reaction occurs effectively and a released particular light source may be detected. The non-inspection object molecules 626 may not be integrated with the glass microbeads 622, but be washed by the solution to the waste liquid zone. Therefore, an optical instrument can be employed to read the actual concentration and quantity of the nucleic acid molecules in reaction at the reaction zone 620.

Fourth Embodiment

Figure 7:
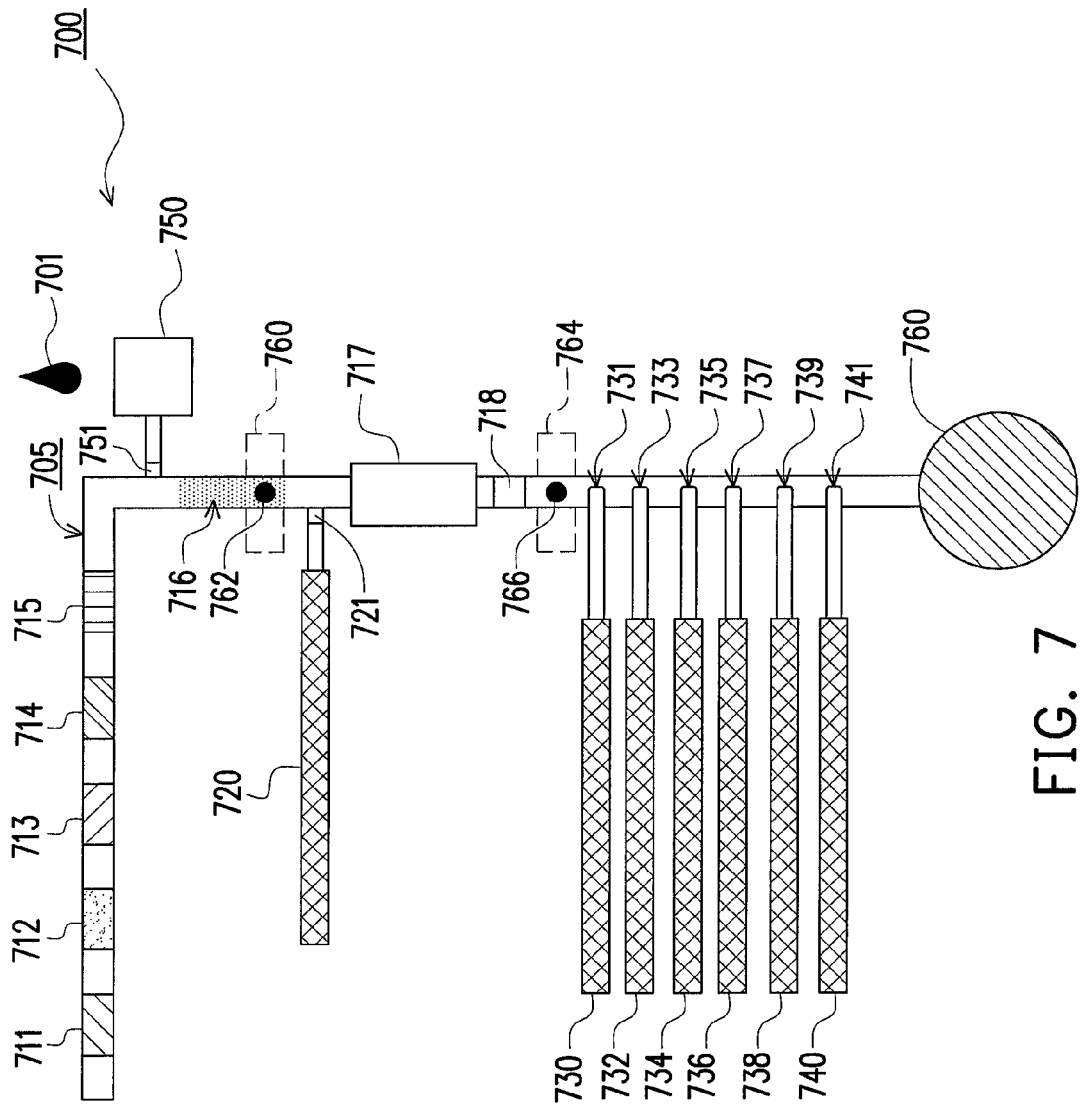
FIG. 7 is a schematic structural view of an inspection chip according to a fourth embodiment of the present invention.

Referring to FIG. 7, a schematic structural view of a fluidic device (an inspection chip) according to a fourth embodiment of the present invention is shown. The inspection chip 700 includes an L-shaped reaction channel 705. The reaction channel 705 includes a stop solution 711, a sabilized chromogem solution 712, a wash buffer 713, a streptavidin-horse radish Peroxidase (HRP) solution 714, a biotinylated anti-vascular endothelial growth factor (VEGF) solution 715, a quantitative zone 716, a reaction zone 717, and a reflux-block groove 718. An end of the reaction channel 705 is connected to a waste liquid zone 760. Further, a sample dripping zone 750 is connected to the reaction channel 705 adjacent to the quantitative zone 716 through a stop valve 751.

A vacuum valve tube 720 is disposed between the quantitative zone 716 and the reaction zone 717, and is also connected to the reaction channel 705 through a stop valve 721. Moreover, vacuum valve tubes 730, 732, 734, 736, 738, and 740 are connected to the part of the reaction channel 705 between the reflux-block groove 718 and the waste liquid zone 760. These vacuum valve tubes each have an extension end extending into the reaction channel 705, and the extension ends are fragile.

The inspection chip 700 includes two magnetic actuating unit sets composed of a first set formed by a first magnetic unit 760 and a second magnetic unit 762, and a second set formed by a third magnetic unit 764 and a fourth magnetic unit 766.

The first magnetic unit 760 is an external actuating unit made of, for example, a magnetic or electromagnetic coil. The second magnetic unit 762 is an adsorbate made of a material attracted by the magnetic force, and disposed at one end of the quantitative zone 716 in the reaction channel 705. The materials of the external actuating unit and the adsorbate are exchangeable. The first magnetic unit 760 can be moved to a position below the second magnetic unit 762, and when the first magnetic unit 760 is moved, the second magnetic unit 762 is correspondingly actuated to move in the reaction channel 705. Thereby, the extension end of the vacuum valve tube 720 in the reaction channel 705 is broken, and a driving force is generated to draw the sample 701 to move toward the reaction zone 717 in the reaction channel 705.

Further, the third magnetic unit 764 is an external actuating unit made of, for example, a magnetic or electromagnetic coil. The second magnetic unit 766 is an adsorbate made of a material attracted by the magnetic force, and disposed between the reaction zone 717 of the reaction channel 705 and the vacuum valve tube 730. The materials of the external actuating unit and the adsorbate are exchangeable. The first magnetic unit 764 can be moved to a position below the second magnetic unit 766, and when the first magnetic unit 764 is moved, the second magnetic unit 766 is correspondingly actuated to move in the reaction channel 705. Thereby, the extension ends of the vacuum valve tubes 730, 732, 734, 736, 738, 740 in the reaction channel 705 are sequentially broken to generate a driving force. In particular, when the extension end of the vacuum valve tube 730 is broken, a driving force is generated to draw the sample 701 into the reaction zone 717 for reaction. After that, the extension ends of the vacuum valve tubes 732, 734, 736, 738, 740 are sequentially broken, and driving forces are generated to sequentially draw the biotinylated anti-VEGF solution 715, the streptavidin-HRP solution 714, the wash buffer 713, the sabilized Chromogem solution 712, and the stop solution 711 into the reaction zone 717 for reaction.

In this embodiment, a vacuum capillary is employed as a power for performing a streptavidin-HRP color reaction for the VEGF. The VEGF plays an important role in the tumor vascular formation and becomes a therapeutic target for tumor diagnosis and anti-tumor vascular formation.

The principle of this embodiment utilizes the specificity between the antigen and antibody. A bonding reaction is performed on the VEGF in the sample 701 and an anti-VEGF in the reaction zone 717 (the anti-VEGF in the reaction zone 717 may be fixed on a strip or directly fixed on a substrate). Next, the biotinylated anti-VEGF is bonded to the reacted VEGF. Finally, a bonding reaction is performed on the streptavidin-HRP and the biotinylated anti-VEGF, and a detection is carried out afterward to figure out whether any VEGF exists in the sample and the quantity thereof.

The inspection chip 700 is operated in the following manner.

First, the sample 701 is dripped in the sample dripping zone 750. The extension end of the vacuum valve tube 720 in the reaction channel 705 is broken by the interaction of the first magnetic unit 760 and the second magnetic unit 762, so that a driving force is generated to draw the sample 701 to move to the quantitative zone 716. Meanwhile, the stop solution 711, the sabilized chromogem solution 712, the wash buffer 713, the streptavidin-HRP solution 714, and the biotinylated anti-VEGF solution 715 also move forward. As the sample 701 flows through the stop valve 751, the stop valve 751 shuts down the gateway to the sample dripping zone 750. After that, the extension end of the vacuum valve tube 730 in the reaction channel 705 is broken by the interaction of the third magnetic unit 764 and the fourth magnetic unit 766, so that a driving force is generate to draw the sample 701 to move toward the reaction zone 717 for reaction. Meanwhile, the stop solution 711, the sabilized chromogem solution 712, the wash buffer 713, the streptavidin-HRP solution 714, and the biotinylated anti-VEGF solution 715 also move forward.

Next, the extension end of the vacuum valve tube 732 is broken by the interaction of the third magnetic unit 764 and the fourth magnetic unit 766, so that a driving force is generated to draw the biotinylated anti-VEGF solution 715 to move toward the reaction zone 717 for reaction. Meanwhile, the stop solution 711, the sabilized chromogem solution 712, the wash buffer 713, and the streptavidin-HRP solution 714 also move forward.

Similarly, the extension end of the vacuum valve tube 734 is broken, and a driving force is generated to draw the streptavidin-HRP solution 714 to move toward the reaction zone 717 for reaction. Meanwhile, the stop solution 711, the sabilized chromogem solution 712, and the wash buffer 713 also move forward. Further, the extension end of the vacuum valve tube 736 is broken, and a driving force is generated to draw the wash buffer 713 to move toward the reaction zone 717. Thereby, the unreacted streptavidin-HRP solution 714 and biotinylated anti-VEGF solution 715 are washed away, and the waste liquid flows into the waste liquid zone 760. The extension end of the vacuum valve tube 738 is broken, and a driving force is generated to draw the sabilized chromogem solution 712 to move toward the reaction zone 717 for reaction. Meanwhile, the stop solution 711 also moves forward. The extension end of the vacuum valve tube 740 is broken, and a driving force is generated to draw the stop solution 711 to move toward the reaction zone 717 for reaction. Meanwhile, the waste liquid flows into the waste liquid zone 760. Afterward, the reaction is observed or measured, so as to carry out a qualitative or quantitative analysis.

Fifth Embodiment

Immunoassay Inspection (Magnetic Microbeads)

Figure 8:
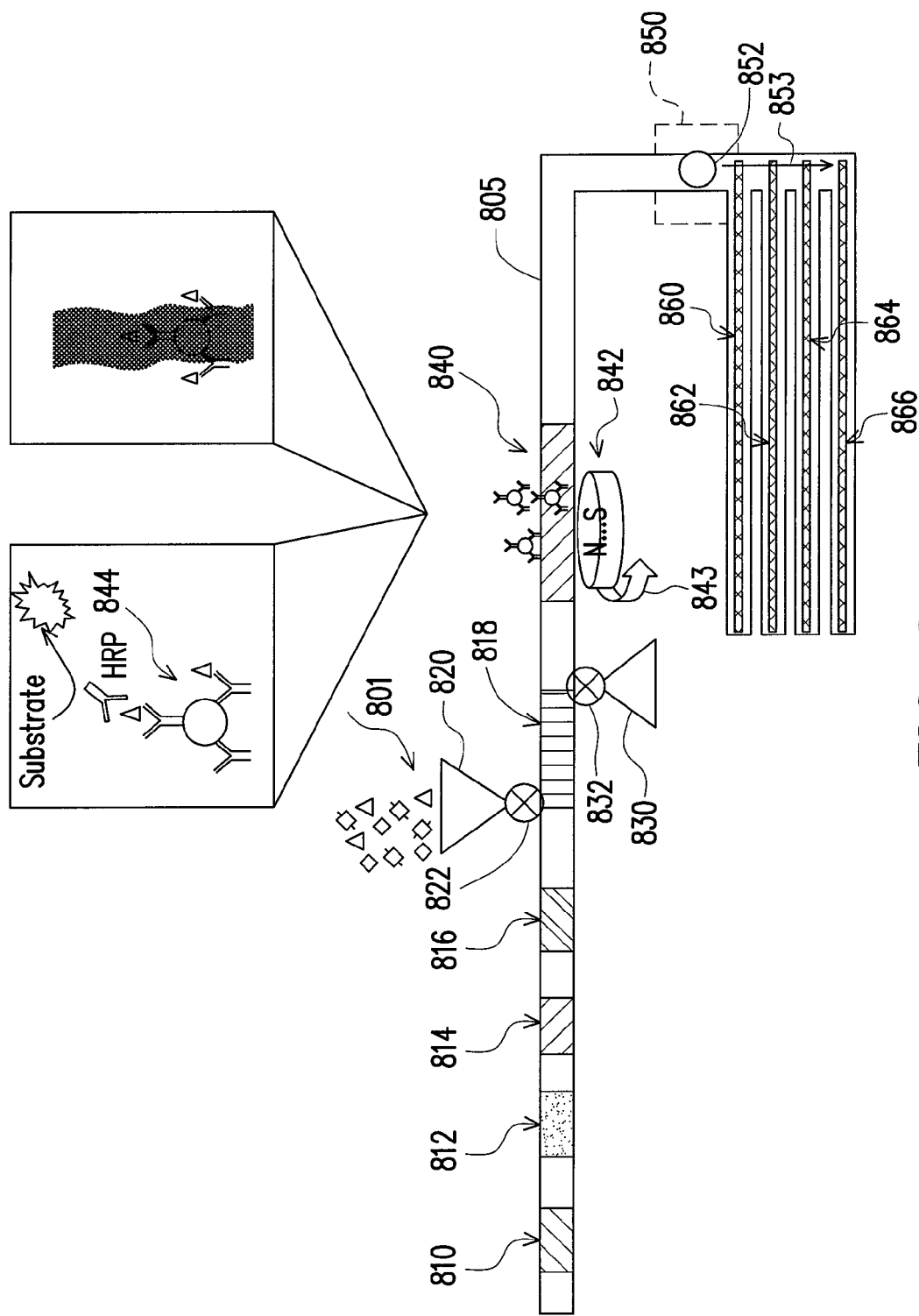
FIG. 8 is a schematic structural view of an inspection chip according to a fifth embodiment of the present invention.

Referring to FIG. 8, a schematic structural view of a fluidic device (an inspection chip) according to a fifth embodiment of the present invention is shown. The inspection chip 800 includes an L-shaped reaction channel 805. The reaction channel 805 includes a substrate solution 810, a wash buffer 812, an HRP-antibody solution 814, a wash buffer 816, a quantitative zone 818, and a detection zone 840. A magnet 842 is disposed below the detection zone 840, and generates a changing magnetic field by rotating in a direction 843. Further, a sample dripping zone 820 is disposed in front of the quantitative zone 818 of the reaction channel 805, and is connected to the reaction channel 805 through a gel valve 822.

A vacuum valve tube gate 830 is disposed between the quantitative zone 818 and the detection zone 840, and also connected to the reaction channel 805 through a gel valve 832. In addition, vacuum valve tube gates 860, 862, 864, and 866 are connected to an end portion of the reaction channel 805.

The inspection chip 800 further includes an adsorbate 852 capable of moving under an adsorption force from an actuating unit 850. The actuating unit 850 is a magnetic unit made of, for example, a magnetic or electromagnetic coil, and the adsorbate 852 is made of a magnet or electromagnet, or any material attracted by the actuating unit 850. As shown in the figure, the actuating unit 850 is disposed below the adsorbate 852, and the actuating unit 850 when moving in a direction 853 may correspondingly actuate the adsorbate 852 to move in the same direction. Then, protruding portions of the vacuum valve gates 860, 862, 864, 866 in the reaction channel 805 are sequentially broken by the adsorbate 852 at different time points or sequences so as to generate an adsorption force. That is, the inspection chip 800 of this embodiment is characterized in operating at a fixed time and sequence, and capable of implementing an inspection at a predetermined time or sequence.

The inspection chip 800 is operated in the following manner.

When a blood is dripped in the injection sample dripping zone 820, blood corpuscles are separated by a membrane. Next, the vacuum valve tube gate 830 is opened to allow the sample flow through the gel valves 822, 832 to the quantitative zone 818. As the gel valves 822 and 832 are designed to expand after absorbing water, the sample is prevented from flowing into the reaction channel 805, and thus obtains certain volume in the quantitative zone 818. Afterward, as the adsorbate 852 is driven by the actuating unit 850, the vacuum valve tube gates 860, 862, 864, and 866 are sequentially opened, and the opening time can be controlled to adjust the reaction time. Moreover, the sample in the quantitative zone 818 and the cold light reactants and buffer solutions (i.e., the wash buffer 816, the HRP-antibody solution 814, the wash buffer 812, and the substrate solution 810) pre-sealed in the chip sequentially flow through the detection zone 840.

Further, the detection zone 840 contains magnetic microbeads 844 with particular probes. Thereby, when specially marked molecules to be inspected in the sample pass by, the magnetic microbeads are integrated with the molecules, such as the HRP shown in the figure, and the molecules are captured in the chamber. The molecules not to be inspected or impurities are washed away by the buffer solution. The external magnet 842 is used for assisting the mixing and capturing process. The reactants sequentially flowing through the external magnet 842 enable the immunoreaction to generate cold light signals, and an optical system inspection method is employed to analyze the quantity of the subject matter in the substances to be inspected. In addition to the optical inspection, an external magnetic field can be applied to the magnetic compound, and the magnetization intensity of the beads is measured to determine the concentration of the subject matter in the substances to be inspected. Thus, an immunology inspection can be performed rapidly and accurately.

Sixth Embodiment

Non-Electric Magnetic Field Driving Mode

A fluidic device and a method thereof are provided for sealing a proper amount of fluid (such as vacuum, compressed air, gas, or liquid reagent) with a brittle material. By moving a magnetic substance through the adsorption of an external magnet (or electromagnet), the brittle material for pre-sealing is broken, and the fluid in the brittle material interacts with the external environment to generate a pump reaction (for example, in the application of sealing vacuum, o compressed air, or gas). In addition, the invention may also be used for storing a liquid reagent (for example, a buffer reagent or a washing liquid) in a device for a long time. Thereby, the fluidic device can be made small and portable. Moreover, in order to achieve the aforementioned characteristic of operating at a fixed time and sequence, the fluidic device is moved, for example, manually, or by a power spring or an electric motor according to design requirements.

Figure 9:
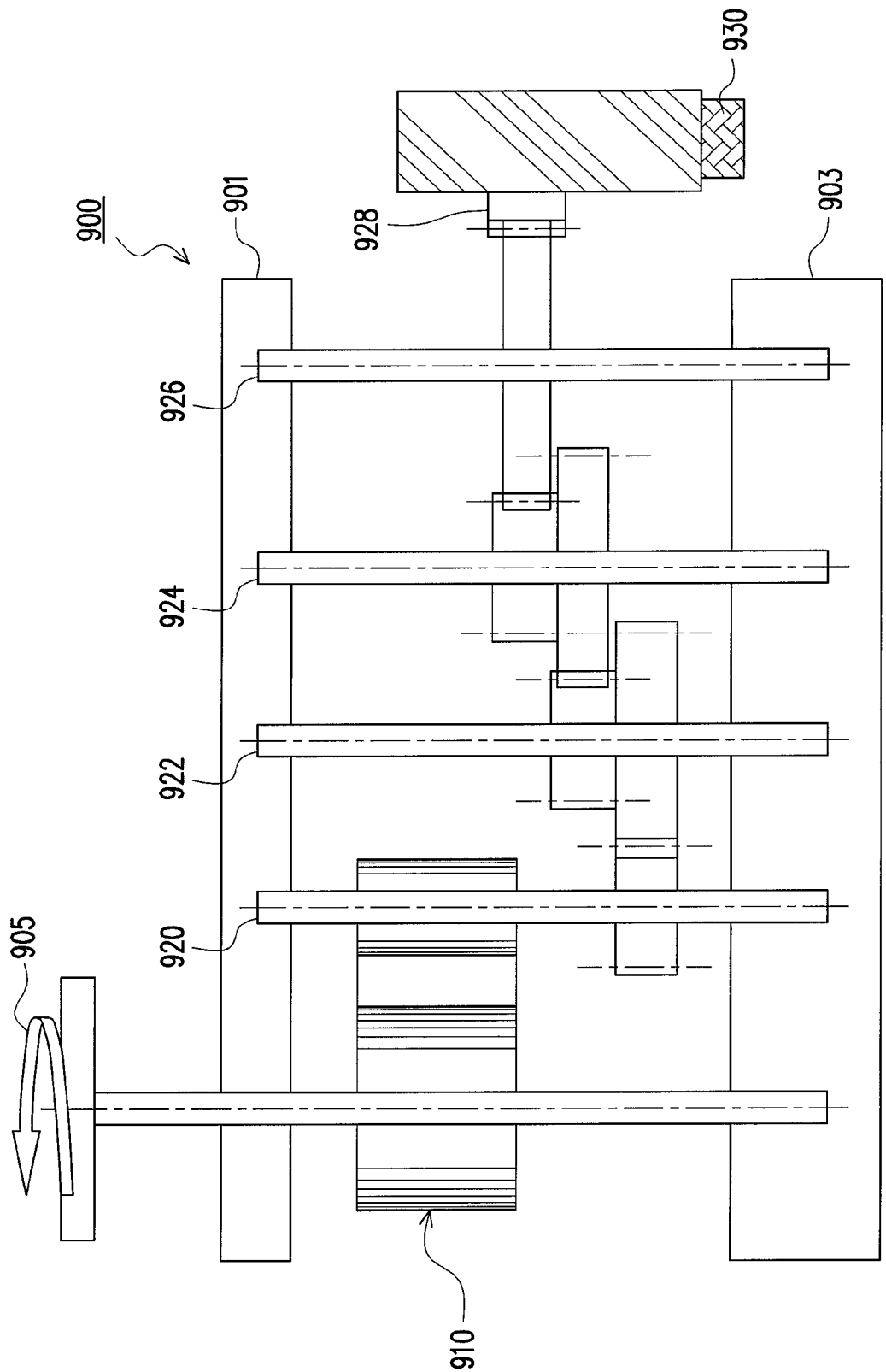
FIG. 9 is a schematic structural view illustrating a non-electric mode for driving a magnet according to an embodiment of the present invention.

In this embodiment, a non-electric mode for driving a magnet is proposed with reference to FIG. 9. In particular, a spring with a fixed torque and a plurality of gear sets are employed to achieve the purpose of moving at a fixed time. As shown in the figure, a non-electric driving unit 900 includes an upper base 901 and a lower base 903, and a plurality of gear sets is configured between the two bases. For example, a fixed torque spring 910 rotates in a clockwise direction or an anti-clockwise direction 905 under an external force. Then, the torque generated by the fixed torque spring 910 drives gear sets 920, 922, 924, and 926 to move. Afterward, a magnet 930 is propelled to move by a gear rack 928.

Though the present invention has been disclosed above by the embodiments, they are not intended to limit the present invention. Besides breaking a vacuum tube to generate an adsorption pump, the present invention may also break a capillary sealed with a compressed gas to generate a propelling pump by referring to ROC patent application No. 96,125, 027. Anybody skilled in the art can make some modifications and variations without departing from the spirit and scope of the present invention. Therefore, the protecting range of the present invention falls in the appended claims.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fluidic device, comprising:
   a main body, provided with a moving channel;
   at least one capillary, comprising a closed space inside and fabricated by a brittle material, wherein a portion of the capillary is located in the moving channel; and
   an adsorbate, disposed in the moving channel, and adsorbed by an external actuating unit to move together in the same direction, wherein the portion of the capillary located in the moving channel is broken after the adsorbate is moved, so that the closed space in the capillary communicates with an external environment of the capillary.

2. The fluidic device according to claim 1, wherein the capillary is made of glass.

3. The fluidic device according to claim 1, wherein the capillary is made of quartz, ceramic, plastic, or a composite material.

4. The fluidic device according to claim 1, wherein the closed space in the capillary is used to seal vacuum, compressed air, gas, liquid reagent, or fluid.

5. The fluidic device according to claim 4, wherein the fluid sealed by the capillary is a buffer reagent or washing liquid.

6. The fluidic device according to claim 4, wherein after the capillary is broken, the sealed fluid flows out to generate a pump reaction.

7. The fluidic device according to claim 1, wherein the adsorbate and the external actuating unit form a magnetic actuating unit set, so as to generate an adsorption force through a magnetic force.

8. The fluidic device according to claim 1, wherein the external actuating unit is made of a magnetic or electromagnetic coil, and the adsorbate is made of a material attracted by the magnetic force.

9. The fluidic device according to claim 1, wherein the external actuating unit is moved manually, or by a power spring, or by an electric motor.

10. A fluidic device, comprising:
    a main body, provided with a moving channel and a reaction channel;
    a sample well, disposed therein with an inspection sample, and connected to the reaction channel;
    at least one capillary with a closed space inside, for sealing vacuum or fluid, and fabricated by a brittle material, wherein a portion of the capillary is located in the moving channel, and the opposite end thereof is connected to the reaction channel; and an adsorbate, disposed in the moving channel, and adsorbed by an external actuating unit to move together in the same direction, wherein the portion of the capillary located in the moving channel is broken after the adsorbate is moved, so that the vacuum is released or the fluid flows out to generate a pump reaction, and thus the inspection sample is adsorbed or forced to flow into the reaction channel.

11. The fluidic device according to claim 10, wherein a stop valve is disposed between the sample well and the reaction channel, and is closed after the inspection sample flows into the reaction channel for a predetermined-period of time.

12. The fluidic device according to claim 10, wherein the capillary is connected to the reaction channel through the stop valve, and the stop valve is closed if the inspection sample flows into the capillary after flowing into the reaction channel for a predetermined period of time.

13. The fluidic device according to claim 10, further comprising a plurality of other capillaries disposed in parallel in the main body, wherein a portion of each capillary is located in the moving channel, and the opposite end thereof is connected to the reaction channel, and the capillaries are broken in a predetermined sequence and at a predetermined time by moving the adsorbate, so that the reaction channel generates a pump reaction.

14. The fluidic device according to claim 13, further comprising another adsorbate, wherein the moving channel comprises a first portion of channel and a second portion of channel, the adsorbate is located in the first portion of channel for breaking the capillary, and the other adsorbate is located in the second portion of channel for breaking the other capillaries.

15. The fluidic device according to claim 13, further comprising a solvent storage tube connected to the reaction channel, wherein the solvent storage tube pre-stores various kinds of reaction solutions, and the reaction solutions flow into the reaction channel in the predetermined sequence at the predetermined time under the pump reaction generated by the other capillaries, so as to interact with the inspection sample.

16. The fluidic device according to claim 10, wherein the capillary is made of glass.

17. The fluidic device according to claim 10, wherein the capillary is made of quartz, ceramic, plastic, or a composite material.

18. The fluidic device according to claim 10, wherein the fluid sealed by the capillary one selected from among vacuum, compressed air, gas, liquid reagent.

19. The fluidic device according to claim 10, wherein the fluid sealed by the capillary is a buffer reagent or washing liquid.

20. The fluidic device according to claim 10, wherein after the capillary is broken, the sealed fluid flows out to generate a pump reaction.

21. The fluidic device according to claim 10, wherein the adsorbate and the actuating unit form a magnetic actuating unit set, so as to generate an adsorption force through a magnetic force.

22. The fluidic device according to claim 10, wherein the actuating unit is made of a magnetic or electromagnetic coil, and the adsorbate is made of a material attracted by the magnetic force.

23. The fluidic device according to claim 10, wherein the external actuating unit is moved manually, or by a power spring, or by an electric motor.

24. A fluidic device, comprising:

a main body, provided with a reaction channel, wherein a portion of the reaction channel pre-stores various kinds of reaction solutions;

a sample well, disposed therein with an inspection sample, and connected to the reaction channel;

a plurality of vacuum valve tubes, each comprising an extension end extending to and connected in the reaction channel; and an adsorbate, disposed in the moving channel, and moved by an adsorption force of an external actuating unit, wherein due to the movement of the adsorbate, the extension end of one of the vacuum valve tubes located in the reaction channel is broken, so that the vacuum valve tube generates a pump reaction and thus the inspection sample is adsorbed or forced to flow into the reaction channel, and the extension ends of the other vacuum valve tubes located in the reaction channel are sequentially broken at a predetermined time, so that the other vacuum valve tubes respectively generate a pump reaction in sequence and thus the reaction solutions are adsorbed or forced to interact with the inspection sample.

* * * * *